US011740995B2

(12) United States Patent
Chen et al.

(10) Patent No.: US 11,740,995 B2
(45) Date of Patent: Aug. 29, 2023

(54) SOURCE QUALITY CHECK SERVICE

(71) Applicant: SAP SE, Walldorf (DE)

(72) Inventors: Wendan Chen, Vancouver (CA);
Susanne Hempel, Vancouver (CA);
Abdallah El Sahhar, Dubai (AE); Ute Weingart, Schwetzingen (DE); Takane Ozaki, Tokyo (JP); Koichi Tsumoto, Vancouver (CA); Boliang Chen, Vancouver (CA); Zhong Xian Hu, Vancouver (CA); Zhen Cheng, Vancouver (CA); Bowen Zhang, Vancouver (CA); Liufang Wu, Shanghai (CN); Qiming Xu, Shanghai (CN)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 17/160,246

(22) Filed: Jan. 27, 2021

(65) Prior Publication Data

US 2021/0349808 A1    Nov. 11, 2021

Related U.S. Application Data

(60) Provisional application No. 63/021,584, filed on May 7, 2020.

(51) Int. Cl.
*G06F 11/36*    (2006.01)
*G06F 9/54*    (2006.01)
*G06F 8/75*    (2018.01)

(52) U.S. Cl.
CPC ............ *G06F 11/3624* (2013.01); *G06F 8/75* (2013.01); *G06F 9/541* (2013.01)

(58) Field of Classification Search
CPC ......... G06F 8/75; G06F 9/541; G06F 11/3624
USPC ............................................... 717/125
See application file for complete search history.

(56) References Cited

U.S. PATENT DOCUMENTS

| | | | |
|---|---|---|---|
| 10,678,678 B1 * | 6/2020 | Tsoukalas | G06F 11/3664 |
| 2002/0055833 A1 * | 5/2002 | Sterling | G06Q 30/02 |
| | | | 703/22 |
| 2007/0204204 A1 * | 8/2007 | Sul | H03M 5/145 |
| | | | 714/776 |
| 2007/0260584 A1 * | 11/2007 | Marti | G06F 16/258 |
| 2014/0074806 A1 * | 3/2014 | Koren | G06F 40/253 |
| | | | 707/694 |
| 2018/0225285 A1 * | 8/2018 | Anglin | G06F 40/263 |
| 2021/0240840 A1 * | 8/2021 | Goldsteen | H04L 9/0894 |

* cited by examiner

*Primary Examiner* — Chat C Do
*Assistant Examiner* — Bradford F Wheaton
(74) *Attorney, Agent, or Firm* — Klarquist Sparkman, LLP

(57) ABSTRACT

Techniques and solutions are provided for a source quality check service configured to analyze source text and identify issues in the source text. The source quality check service may identify the issues by performing a selected subset of checks with a centralized source quality check engine, and may be called from within one or more of an Integrated Development Environment (IDE), a build process, and/or a translation process to perform the selected subset of checks. The source quality check service may be further configured to output a report of the identified one or more issues.

19 Claims, 14 Drawing Sheets

FIG. 2

| FILE 204 | KEY 202 | VALUE 206 | TYPE 208 | DESCRIPTION 210 | SUGGESTION 212 |
|---|---|---|---|---|---|
| src/main/res/file1.properties | translation-placeholder | Enter your translation heer target segments | basic-linguistic checks | We don't know this word, and it's not in your terminology either | Consider using one of these: her, here, hear, peer, deer. |
| src/main/res/file1.properties | translation-title | Target Segment | duplicate-id | Duplicate string id "translation-title" is found | Remove the duplicate string id. |
| src/main/res/file1.properties | translation-title | TRANSLATION | duplicate-id | Duplicate string id "translation-title" is found | Remove the duplicate string id. |
| src/main/res/file1.properties | confirm-translation | Save information | ui-text-length | The text length restriction set is shorter than the translation required length for string id "confirm_translation" | If the text length restriction is not needed for string id "confirm-translation", remove it. Otherwise, increase it from 8 to 28 characters according to UI Text Space Calculator: (url) |
| src/main/res/file1.properties | language-en-US | Country: English | country-region-guidance | Not compliant with the Country/Region-Specific Guidance | Term "Country" found. Adjust the text. |
| src/main/res/file1.properties | advanced-search-list | Black list status: | non-inclusive-terms | Not compliant with requirements to use inclusive language: [url] | Term "Black list" found. Adjust to use more inclusive language. |

Runtime-EclipseApplication – HelloWorld/Property Files/messageB.properties – Eclipse SDK Project Explorer ✕     fileB.properties    messageB.properties    system.properties ✕     Task List ✕

▸ HelloWorld

```
24  #XBTN, 24, text
25  btnCountry=Pick Country
26
27  # Button texts
28  #XMSG, 29, Error message
⚠ 29  errAddGroup=Add resource to group failed.       504
30  #XMSG, 2, Error message
⚠ 31  errBadBrowse=Invalid file contents
32  #XMSG, 48, Error message
33  errBadVersion=The version of the import file is not supported.
34  #XMSG, 32, Error message
35  errCreds=Invalid credentials
36  #XMSG, 34, Error message
37  errDropFromGroup=Remove resource from group failed
38  #MSG, 31, Error message
39  errInfoLoad=Error loading resource details.
```

Outline ✕

LX Checks ✕

| SEVERITY | FILE | LINE # | ISSUE TYPE | DESCRIPTION |
|---|---|---|---|---|
| 1 | /HelloWorld/Property Files/system.properties | 29 | UI Text Length | Recommended text length is: 29 |
| 1 | /HelloWorld/Property Files/system.properties | 31 | UI Text Length | Recommended text length is: 21 |
| 1 | /HelloWorld/Property Files/system.properties | 14 | Duplicate String ID | Duplicate string ID found: Please change/remove... |
| 1 | /HelloWorld/Property Files/system.properties | 16 | Country/Region Guidance | Not compliant with Country/Region-Specific Guidance... |
| 1 | /HelloWorld/Property Files/system.properties | 25 | Country/Region | Not compliant with Country/ |

502

Boot Dashboard ✕

FIG. 6

```
"results": [
{
    "identifier": "src/main/resources/i18n.properties",
    "issues": [
        {
            "type": "basic-linguistic-checks",
            "description": "<span>We don't know this word, and it's not in your terminology either.</span> (url1)",
            "suggestion": "Consider using one of these: her, here, hear, peer, deer",
            "details": {
                "extractedText": "heer",
                "originalBegin": 286,
                "originalEnd": 290
            }
        },
        {
            "key": "translation-title",
            "value": "Target Segment:"
            "type": "duplicated-id",
            "description": "duplicate string id \"translation-title\" is found.",
            "suggestion": "please remove the duplicate string id.",
        },
        {
            "key": "translation-title",
            "value": "TRANSLATION"
            "type": "duplicated-id",
            "description": "duplicate string id \"translation-title\" is found.",
            "suggestion": "please remove the duplicate string id.",
        },
        {
            "key": "confirm-translation",
            "value": "Save Information"
            "type": "ui-text-length",
            "description": "The text length restriction set is shorter than the source text itself for string id \"confirm-translation\"",
            "suggestion": "If the text length restriction is not needed for string id \"confirm-translation\", please remove it. Otherwise, please increase it from 8 to 28 characters according to UI Text Space Calculator: (url2)",
        },
        {
            "key": "language-en-US",
            "value": "Country: English",
            "type": "country-region-guidance",
            "description": "Not compliant with the SAP Country / Region-Specific Guidance (url3).",
            "suggestion": "Term \"Country\" found. Adjust the text."
        },
    ]
}
],
"warnings": []
}
```

FIG. 10

Translation Enablement Workbench     Converter Configuration    Power User Dashboard    Admin Dashboard Repository List Search

- ∨ Source Quality
  - ∧ Source Quality Demo

Source Quality / Source Quality Demo /      ← 1000

Repo Group    Scheduling    Configuration    File View    Task Queue

Filter      Column Visibility Setting | Clear Grouping | Clear Column Filters and Sorters

| | Task Group | Action | Status | Trigger Source | Start Time | End Time |
|---|---|---|---|---|---|---|
| | 220372 | Check Source Quality | Warning | Manual | 2019.12.06 20:43:26 | 2019.12.06 20:43:31 |
| | 220371 | Check Source Quality | Warning | Manual | 2019.12.06 20:37:36 | 2019.12.06 20:37:43 |
| | 220370 | Check Source Quality | Warning | Manual | 2019.12.06 20:37:06 | 2019.12.06 20:37:13 |
| | 220320 | Retrieve and Upload | Warning | Manual | 2019.12.06 03:51:36 | 2019.12.06 03:51:49 |

FIG. 11

Translation Enablement Workbench    Converter Configuration    Power User Dashboard    Admin Dashboard Repository List Search > Source
> Source

View File Segments

Filter    Column Visibility Setting    Clear Column Filters and Sorters

| String Key | Source Text | Issue Type | Source Quality Issue Description | Suggestion |
|---|---|---|---|---|
| Translation-placeholder | Enter your translation heer target seg... | basic-linguistic checks | We don't know this word, and it's not in your terminology... | Consider using one of these: her, hear, peer, deer. |
| Translation-title | Target Segment | duplicate-id | duplicate string id "translation-title" is found | Remove the duplicate string id. |
| translation-title | TRANSLATION | duplicate-id | duplicate string id "translation-title" is found | Remove the duplicate string id. |
| confirm-translation | Save information | ui-text-length | The text length restriction set is shorter than the translation required text length... | If the test length restriction is not needed for string id "conf... |
| language-en-US | Country: English | country-region-guidance | Not compliant with the Country/Region-Specific Guidance | Term "Country" found. Adjust the text. |
| advanced-search-list | Black list status: | non-inclusive-terms | Not compliant with the requirements to use inclusive language | Term "Black list" found. Adjust to use more inclusive language. |

1100

SOURCE QUALITY CHECK SERVICE

CROSS-REFERENCE TO RELATED APPLICATION

This application claims the benefit of U.S. Provisional Patent Application No. 63/021,584, filed on May 7, 2020, which is hereby incorporated by reference.

BACKGROUND

Source code, or source text, which include text used in the execution of software programs or other programmable content, is subject to specifications of an associated programming language. Source text that does not adhere to the specifications of the programming language and/or that includes any type of error may cause the program to function improperly, carry through to cause output text to be incorrect, and/or otherwise increase workload at later stages of development to correct the errors. Source text may also be subject to configuration parameters that are defined for a context of the programmable content, including programmable content policies and standards for integrating programmable content (e.g., shared rules, formatting, and/or other parameters to allow for ease of integration). Issues in source text of a software program or other programmable content, as well as a lack of context during translation of the programmable content, can result in mistranslations or unnecessarily abbreviated or truncated translations, increased inquiries from translation, and post-release repairs of the source text.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for a Source Quality Check Service that performs checks on source text at selected time points during a content production process, such as from within an Integrated Development Environment (IDE), during a build process, and/or at a time of text arrival in the translation environment. Checks may be configured initially, then called manually (e.g., per an ad hoc request) and/or automatically (e.g., according to a predetermined or preselected schedule) to check for issues in the source text. The source quality check engine may be configured to perform one or more checks to identify the issues in the source text, the one or more checks including, but not limited to, a local policy non-compliance check, a violation check, one or more checks included in in-house check tools, one or more checks using third party services, a linguistic check, and/or a terminology check. Example issues may include violations of text length recommendations (e.g., cases where restriction values are of insufficient length for translation), policy compliance issues (e.g., issues with country/region guidance compliance), sensitive terminology issues, duplicate string ID issues, issues identified via integration with third party tools, and/or other source text issues. The source quality check engine may output a report indicating results of the performance of the checks.

BRIEF DESCRIPTION OF THE DRAWINGS

FIG. 2 shows an example portion of a user interface for a source quality check service including an identification of checks that may be performed.

FIG. 5 shows an example state of the user interface of FIG. 3 that may be presented when a selection of a particular issue in the report of FIG. 4 is made.

FIG. 6 shows an example of a source quality check report in a JSON format.

FIGS. 9-11 show example user interface windows for a Source Quality Check Service integration scenario in a translation process.

DETAILED DESCRIPTION

Introduction

Figure 1:
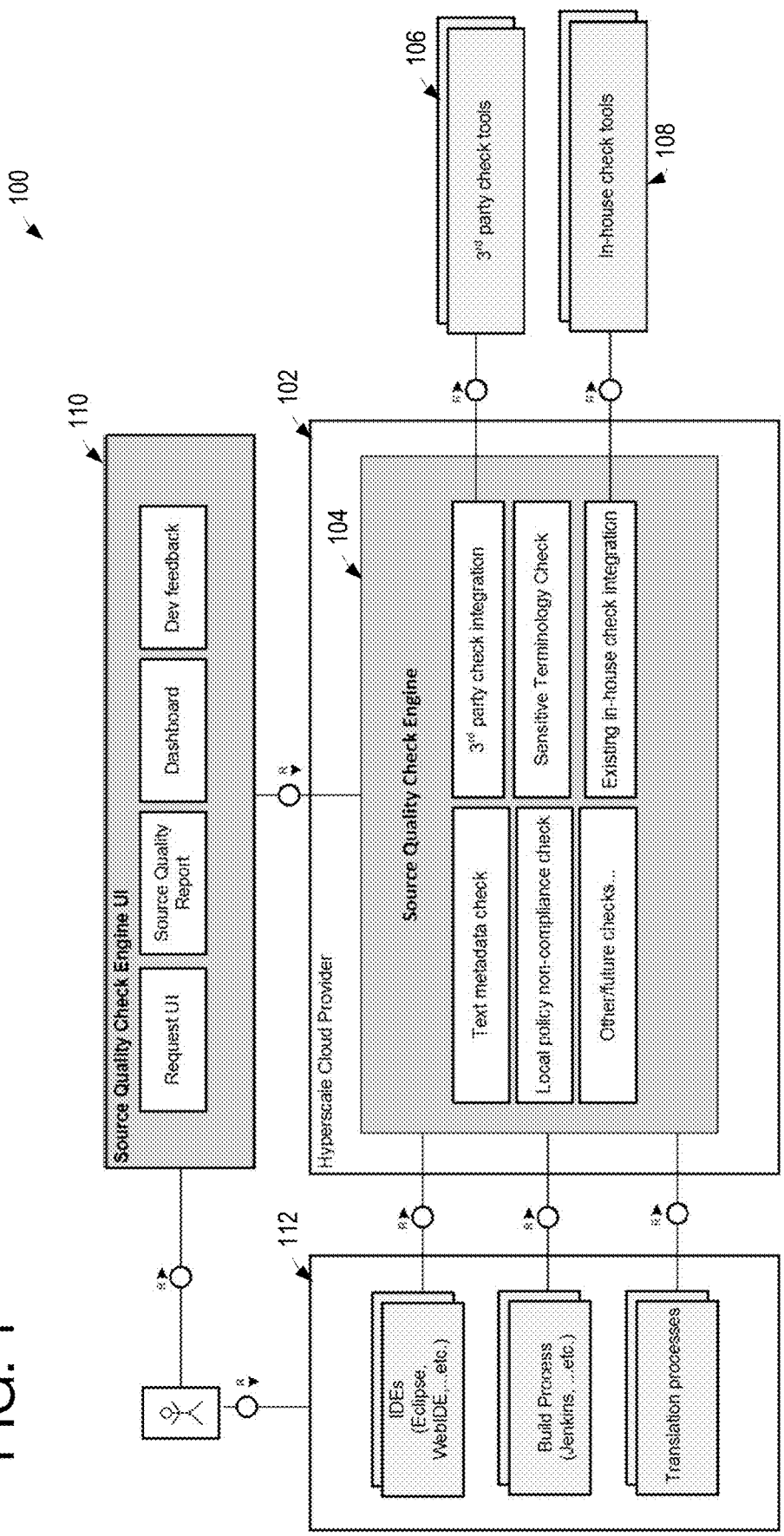
FIG. 1 is an example block diagram for Source Quality Check Service Technical Architecture Modeling (TAM).

Issues and mistakes in the texts on a product user interface can trigger high-stakes customer escalations and cause severe damage to a company's brand due to wrong terminology, wording, or non-compliance with local policies. Untranslated or cut-off texts on user interface screens can lead to an unsatisfying customer experience in all languages. Internal analysis has shown that a significant number of such language (translation) issues are caused by mistakes in the source texts. The later such mistakes are found during the text production process, the more expensive their corrections become, especially if such errors are only caught after the texts have been translated into multiple languages and the translated products have been released.

Changing from an on-premise to a Cloud development mode, where the continuous delivery mode requires fast turnaround times for translation, and correction times are being reduced to near zero, it is even more important to detect and prevent errors as early as possible in the text production process.

This disclosure provides for a service that allows the integration of multiple individual source checks as well as an integration into multiple stages of the text production process. This service can be integrated into either the development environment (IDE), and/or the build process to allow an early detection and correction before the texts are handed over to translation. This way, the checks can be run by the text creators. It also allows to make the checks a mandatory step. Furthermore, the disclosed service can be integrated into the translation process —to allow a monitoring of the checking performance and continuous improvements. At this point, the checks are not run by the text creators. Quality can still be controlled by adding gates that block content with critical errors.

As additional advantages, the disclosed service allows the integration of either existing (internally developed) checks or commercially available check tools that check for specific issue categories, and allows the integration of additional checks—so that more checks can be developed at a later point in time for issues where no check exists yet. The disclosed service may be based on cloud technology, which allows all developers worldwide access with appropriate authentication, including an option for a private cloud if a more secured environment is desired.

Further advantages of the disclosed service over commercially available tools include that the disclosed service can be integrated into several stages of the text production process (depending on scenario and setup): at the time of text creation (e.g., in an IDE), at the time of the build process, and/or at the time of the text arrival in the translation environment. The disclosed service also allows the integration of existing internal checks as well as commercially available third party check tools, and is centrally accessible, in order to avoid the need for users and teams to run and/or design multiple tools individually. The disclosed service provides the ability to add additional checks that are not commercially available, and further allows users and teams to activate/deactivate certain checks and/or make them mandatory, based on the configuration of an associated process.

The disclosed service has been developed on the cloud with Application Programming Interfaces (APIs) in such a way that it allows the integration of such commercially available third party tools if these tools lend themselves for integration with the disclosed service, and if these tools have been found effective enough to identify and prevent such issues.

Some example benefits of a centralized service as disclosed may include that there is no need for individual development teams to create and maintain their own checks, and no need for each development team individually to understand how to use internal tools or third party tools. For example, the disclosed service supports over 30 file formats and allows customization (.java, j son, .properties, .strings, .stringsdict, .txt, .xlf, .html . . . etc.), therefore development teams do not need to spend time understanding such different file formats.

The service is developed with parameters under consideration, such as the kind of checks that are acceptable by development teams and targeted features from Application Developers. Example targeted features may include: having little to no impact on system performance, being straightforward to use (correct/incorrect) and triggering a low number of false positives, being customizable to allow activation/deactivation of individual checks, being configurable so that existing code or text can be hidden and/or skipped from checking (to allow checking for newly created texts only), and/or being available for integration (e.g., API availability and meeting some standards and requirements).

EXAMPLES

First Example Block Diagram

FIG. 1 shows an example Source Quality Check Service Technical Architecture Modeling (TAM) block diagram 100. It is to be understood that the checks described herein are exemplary, and any suitable check may be added into the disclosed Source Quality Check Service environment.

As shown, a hyperscale cloud provider 102 (or other computing environment) may host a source quality check engine 104 that is configured to perform one or more checks on source text of targeted programmable content. Example checks may include: Text Metadata Checks, which may check anything related to the metadata of a text such as length restrictions or string IDs; Local Policy Non-Compliance Checks, which may check any non-compliance related to the existing local or global policies; Sensitive Language checks, which may check for non-inclusive terminology and/or compliance with language/terminology guidelines as defined on a company-level; Third Party checks, which may include checks that are based on check tools 106 developed by third parties, including more comprehensive checks such as spelling and grammar checks and/or I18N check tools; and/or the service may allow for the integration of other existing inhouse checks, using in-house check tools 108, as well as provide for an integration of future checks to be developed.

The source quality check engine 104 may be interacted with via API calls or source quality check engine user interfaces 110. For example, RESTful APIs may be used for initiating a request for a source quality check(s) and receiving a resulting source quality report in a machine readable file format. The user interface 110 may include a request user interface, for initiating a source quality check, and a source quality report interface, for outputting/presenting a report of the findings of a requested source quality check. The user interface 110 may also include a dashboard for quickly viewing information regarding available source quality checks and/or historical reports, as well as a developer feedback interface for viewing or receiving (e.g., from a developer that uses the source quality service to perform checks) constructive feedback regarding the operation of the source quality check engine, which may include bug/error reports, suggestions for improvement, developer's resolution fixes and comments on the resolution fixes, etc.

Turning briefly to FIG. 2, an example portion of a user interface (UI) 200 is shown. The user interface 200 illustrates some example checks that may be performed by the Source Quality Check Service and results of such checks after running the checks on source texts. For example, the user interface 200 shows a plurality of string keys identified in column 202, which are located within a file identified in column 204, and corresponding source text (shown in the "value" column 206) from a sample that is evaluated using a source quality check engine in accordance with the present disclosure. Relevant checks are identified in the "type" column 208, and identified source quality issues are presented in the "description" column 210 where applicable in line with the associated string key and source text in order to allow a developer to quickly locate and correct or otherwise address the issues. Additionally, suggestions for correcting each identified issue are presented in line with the identified source quality issues in column 212.

For example, the checks in FIG. 2 include a length restriction check (e.g., the length restriction value of the source text "Save information" is identified as being lower than the recommended length restriction value calculated for the space required by the translated text), a country/region guidance policy check (e.g., the source text "country" is identified as not complying with a country/region guidance/policy), and a duplicate string ID check (e.g., the string key "translation-title" is identified as having two different source texts, so a duplicate string ID warning is provided for the second instance of that string key). The illustrated checks also include linguistic checks and non-inclusive/sensitive terminology checks. It is to be understood that the user interface 200 of FIG. 2 is exemplary, and any of the checks described herein may be presented in a user interface accordingly.

Returning to FIG. 1, as described above and in more detail below, the source quality check engine may be implemented at various stages and in different frameworks, as indicated at 112. For example, as described in the next section, the source quality check service may be integrated into the IDE, the build process framework, and/or the translation processes. Integration may be achieved via API calls, and the user interface 110 may serve as a central user interface for the user to manually initialize a check request, access a dashboard/report/feedback for all executed requests, statistics reports, and feedback.

SQCS Integration Scenarios

As noted above, the source quality check service (SQCS) is developed to be as agnostic as possible so that the service may be called up in different frameworks without the need to develop specific tools for specific frameworks. The following describes the three identified integration scenarios to allow maximum coverage of this service:
 a. Integration into the IDE
 b. Integration into the build process framework
 c. Integration into the translation process Source quality check cloud APIs can be called in various integration scenarios. In examples where there is no direct accessibility to the cloud APIs from the destined systems to be integrated, the disclosed source quality check service also offers an alternative to allow developers to download the check library locally for the integration with IDE and build processes. The integration with IDEs is done via the IDE plugin. The integration with build process depends on which build tools that developers are using. For example, if a developer is using Jenkins, the developer can define a Jenkins job to trigger the source quality check either via the cloud APIs or the local check library. For the translation integration process, the source quality check cloud APIs can be integrated in the relevant tools used in the translation process. The benefits of examples of the disclosed source quality check service that implement a local check library include reducing dependency of external cloud services to avoid unexpected down time and achieve better performance. Additional or alternative examples of the disclosed source quality check service may benefit developers by including APIs hosted on a cloud platform which cannot be accessible by integrated systems; however, such examples may be subject to frequent downloading of the latest library.

In some examples, the earliest check stage (e.g., a first gate for catching errors in source text) happens via the developers' IDE; however, the disclosed source quality check service may enable developers to decide to turn on or off the checks in their IDE. A second gate for catching errors is to check by the build process (e.g., by running the source quality check service as integrated in the build process). This second gate may be controlled by the Quality Engineers and, in some examples, it is guaranteed that even if developers bypass the checks, the build process still triggers the source quality checks after developers submit their code. A last gate for catching errors is to trigger the source quality check after the translation process starts to pick up the source texts for translation. This is normally when the source texts are ready for translation, an automated process may be triggered to retrieve the translatable texts automatically from developers' source repository, perform various checks, do an analysis and then send the package to translators for translation. This is the last gate to check the source quality before the source texts reach translators. This is most beneficial when the other two earlier stages are bypassed; however, in some examples, one or both of the earlier stages may be engaged prior to performing this last, translation-stage check.

SQCS Integration Scenario in IDE

Figure 3:
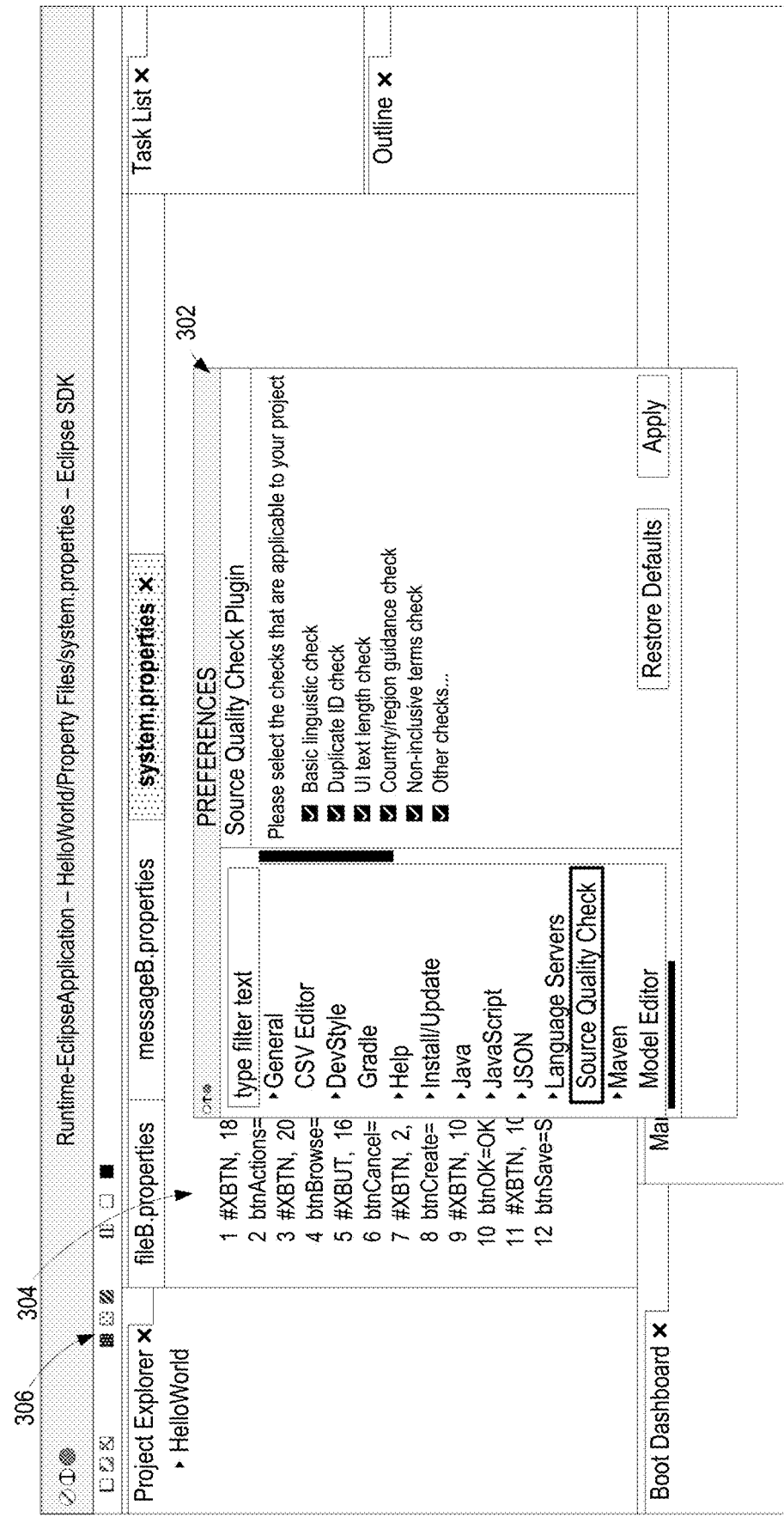
FIG. 3 shows an example portion of a user interface for a source quality check service illustrating the use of the service from within an integrated development environment.

FIG. 3 is an example user interface (UI) 300 for a use of the Source Quality Service from within the IDE at the time developers create source text. In FIG. 3, a user interface window from an IDE plugin prototype is shown. This plugin triggers the Source Quality Check Service to check the texts that the developers create (e.g., the source texts). To use the plugin, developers may configure it before its first usage. For example, the UI 300 shown in FIG. 3 may be used to run source quality checks using the disclosed source quality check service before the developers commit their source code to the source repository.

The user interface window shown in FIG. 3 includes an example configuration window 302 for configuring parameters, such as setting up credentials for authenticating to the Source Quality Check Service, and configuring and/or selecting the checks to be performed. In the non-limiting example of FIG. 3, all checks, including the UI text length check (a length restriction check), etc., are selected to be performed). Although the example of FIG. 3 shows an example view of the user interface made available to users in an IDE, corresponding configuration options may be also made available to users in a build process and/or translation process. It is to be understood that the user interface 300 of FIG. 3 is exemplary, and any of the checks described herein may be presented in a user interface accordingly. After saving the configuration, the developer may run quality checks on the source code, shown for example at 304, by selecting a user interface element, such as user interface element 306. Responsive to selecting the user interface element for running the checks, the application may utilize the Source Quality Service to analyze the files and generate a report.

Figure 4:
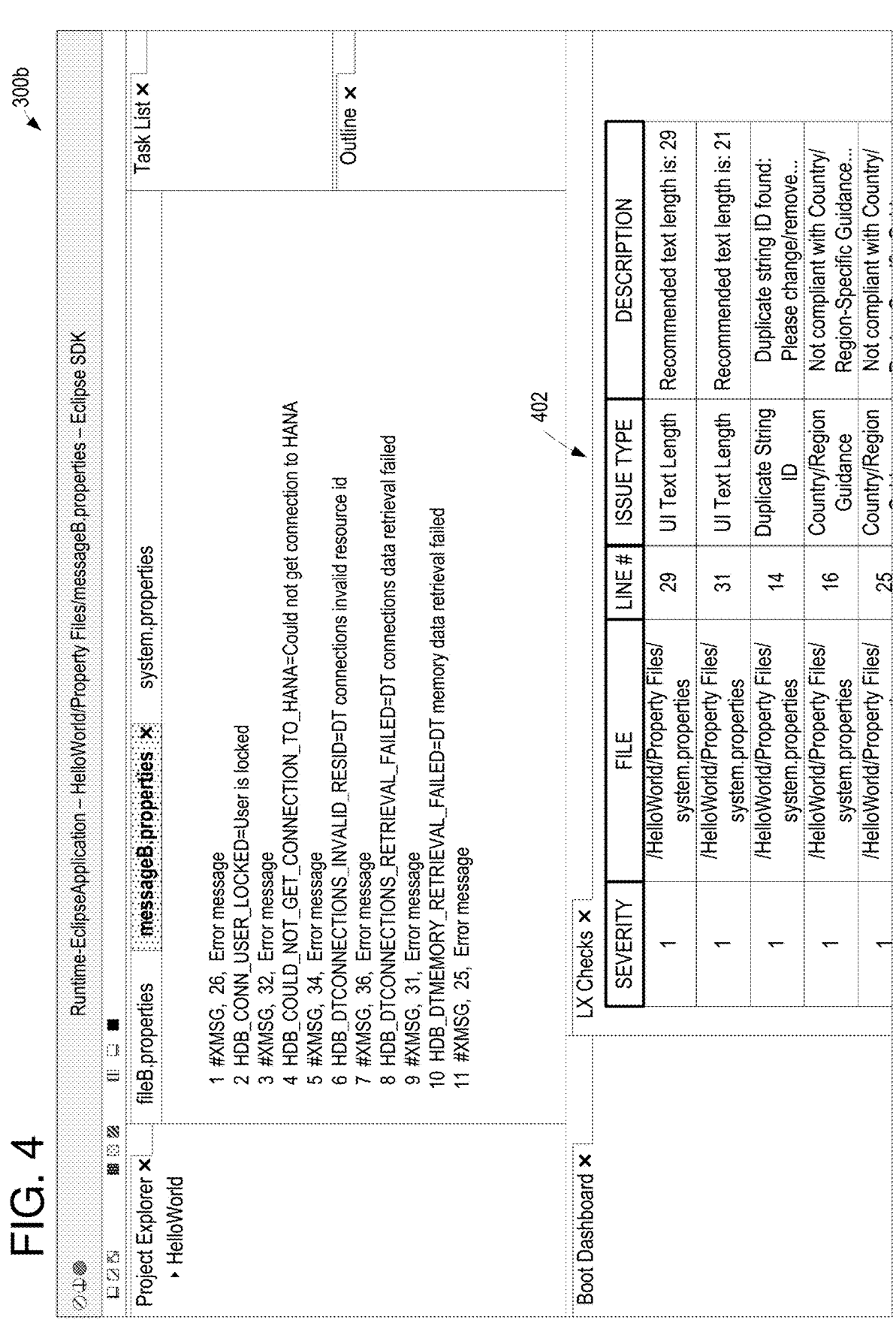
FIG. 4 shows an example state of the user interface of FIG. 3 in which an output report is presented relating to the performance of one or more checks.

FIG. 4 shows an example state 300b of the user interface of FIG. 3 that includes an output report 402 relating to the performance of one or more checks. For example, the user interface state shown in FIG. 4 illustrates an example of how developers may interact with the Source Quality Check plugin in an IDE. The output report may include, for each issue found by the checks, an indication of a file including the issue, a line number for the issue, and issue type of the issue, and a description of the issue as well as an instruction on how to correct the issue.

As shown in FIG. 5, which depicts a further state 300c of the user interface shown in FIGS. 3 and 4 (e.g., illustrating examples of how developers interact with the Source Quality Check plugin in an IDE), selection of a particular issue in the report (e.g., the second issue in the report, highlighted at 502 in FIG. 5) may cause the user interface to jump to the associated line of the source code (e.g., line 31, highlighted at 504 in FIG. 5) in order to allow a user to quickly view and/or address the issue. After addressing one or more issues (e.g., by editing the source code), the user may select a user interface element in the user interface to trigger a save of the updated source code. Responsive to the selection of the user interface element to save the updated source code, the application may re-run the checks and generate an updated report. For example, if all issues are corrected, the updated report may return no issues. In another example, if only some issues are corrected, the updated report may return a subset of the original issues (e.g., only the issues that were not corrected). In still another example, if an edit to address an issue causes a different issue to arise, the updated report may return an indication of the new (different) issue. In some examples, while the application is performing the checks, the user may continue interacting with the source code (e.g., viewing and/or editing).

In some examples, such as examples in which the check request is done via the source quality check cloud APIs, the source quality check report may be stored on a source quality check database to enable tracing of all the history logs to acquire insights at a later time. In other examples, such as examples in which the checks are done via the local check library, the source quality report may stay in the customer's local storage device/database, and another function in the local check library may be called to feed the report data back to source quality check service on the cloud (e.g., the cloud-based source quality check database described above). On the customer's side, whether the quality report is stored or not may be dependent upon the implementation of the integration. For example, in the IDE integration scenario, the storage of the report depends on the implementation of various plugins (e.g., the source quality report may be stored as a temporary log file or may be just used on fly and not stored). As another example, in the integration scenario of build process, the quality report may be stored on the build server associated with each executed jobs. In some examples, each source quality check request will have its own report, separate from each other.

SQCS Integration Scenario in Build Process

As per FIG. 1, in addition to an integration into an IDE, the source quality check service can be integrated into the software build process. This allows for the execution of the service in examples when it cannot be run in the IDE, or for examples where it is preferred to run the service both in the IDE as well as in the software build process. It also allows for example cases where certain checks can be run in the IDE, and other checks are preferred to be run in the build process.

Another integration example created for the Source Quality Service is a Jenkins server integration. Developers can easily integrate the source quality checks into their existing build process so they can make these kinds of builds trigger every time anyone makes a pull request, or they can create specific jobs that get triggered before the files are handed off to be translated.

FIG. 6 shows an example of a source quality check report 600 (e.g., resulting from an API call to perform a source quality check during the build process) in a JSON format (e.g., a machine readable format). In other examples, the API call may be configured to retrieve and/or generate a report in a human readable format (e.g., an Excel file). The report may list all issues found in the source code, including identifying, for each issue, a priority, type, description, suggestion, line number, and line content associated with the issue.

Figure 7:
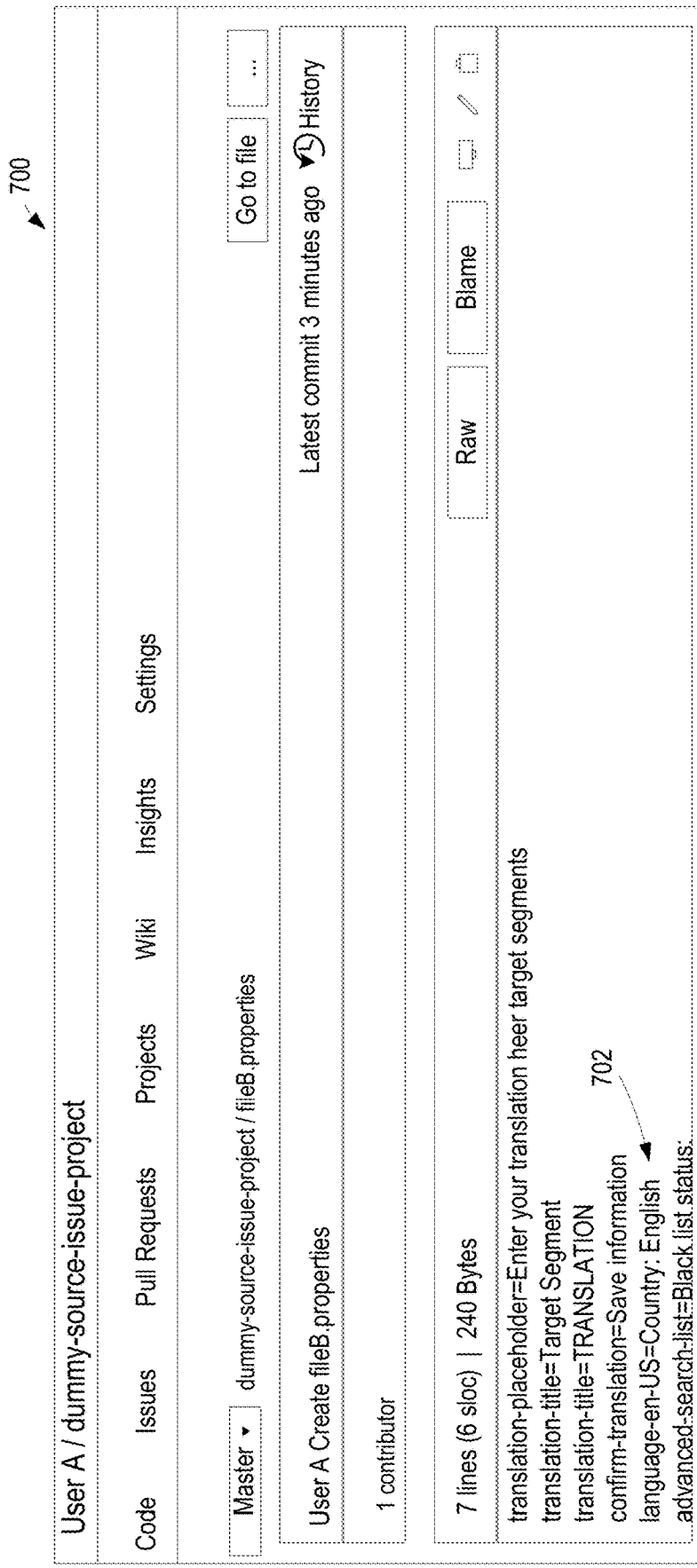
FIG. 7 shows an example user interface including the source code on which the checks were run to generate the report shown in FIG. 6.

FIG. 7 shows an example user interface 700 including the source code on which the checks were run to generate the report shown in FIG. 6, with the line of one of the identified issues being identified at 702. The user interface 700 illustrates one example of integrating the source quality checks in a build process environment.

In examples of SQCS being integrated in the build process, the source quality checks may be performed after developers commit their source code to the source repository. The integration may be triggered by a job defined on the build tool to call one or more Source Quality Check APIs. In some examples, the configuration of the source quality checks is stored as a configuration file in the source repository side. The parameters of the source quality check API for build integration may include information of where to locate developer's source repository (for example: git URL and the branch information), the credential(s) to access the developer's source repository, and/or other parameters.

Figure 8:
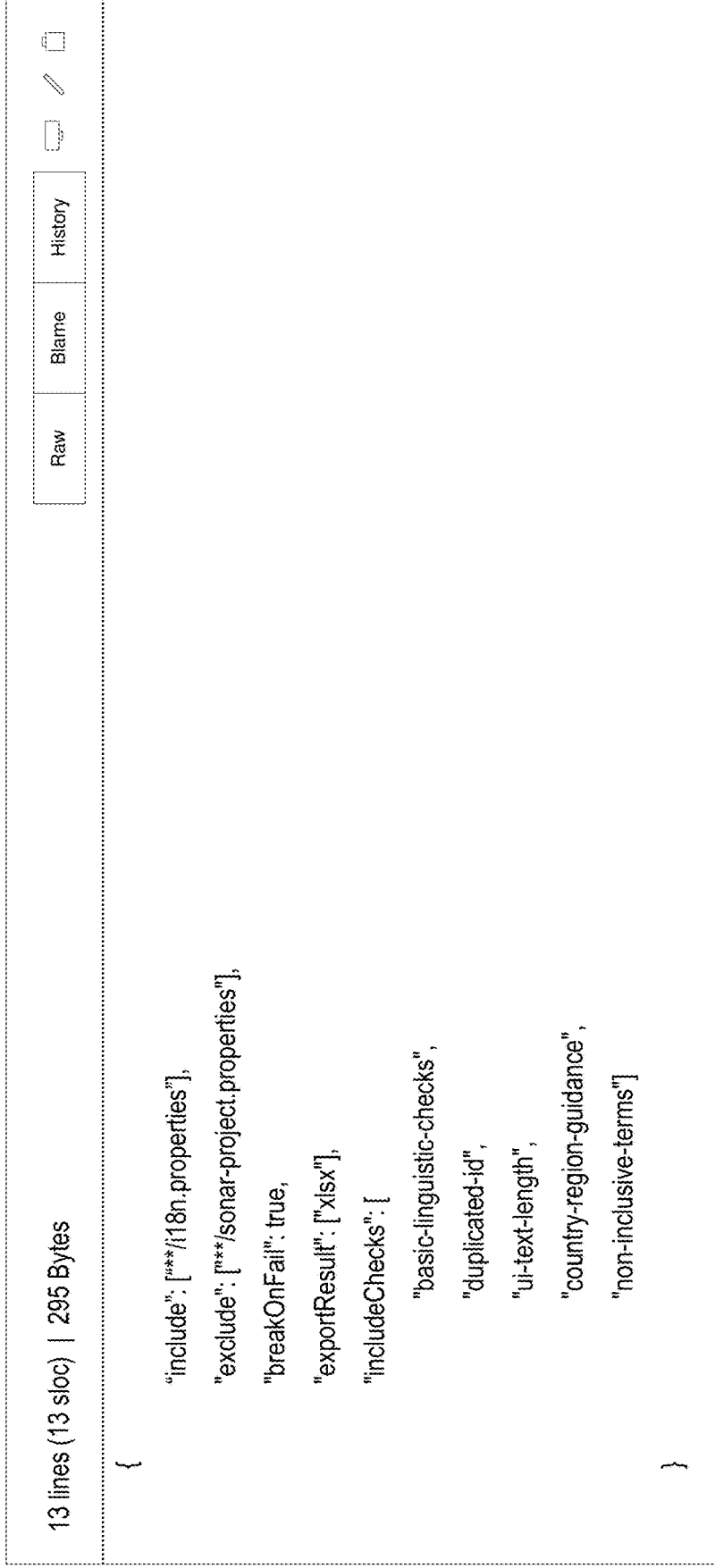
FIG. 8 shows an example of a configuration file for a Source Quality Check Service integration scenario in a build process.

FIG. 8 shows an example configuration file 800, which may be used to define parameters of a source quality check service as implemented in the build process. The configuration file 800 may be included in the root folder of the developer's source repository, and the developer may configure parameters in this file such as: the filters of how to locate source files (e.g., include, exclude, etc.), breakOnFail (e.g., define if the service should break or continue the build process if any source issue is detected), exportResult (e.g., define the source quality report output format; can be human readable format, machine readable format, etc.), includeChecks (e.g., define which checks to turn on/execute), etc. Once the Source Quality Check service receives the request to perform one or more checks via the API call, the Source Quality Check service may use the credential to access the developer's source repository and first read the configuration file to determine parameters of the check.

SQCS Integration Scenario in Translation Process

In addition to the integration of the service into an IDE, and into the build process, the service can be integrated into the translation process in order to quality-check and also allow for a correction of the files by the developers before translation starts.

Figure 9:
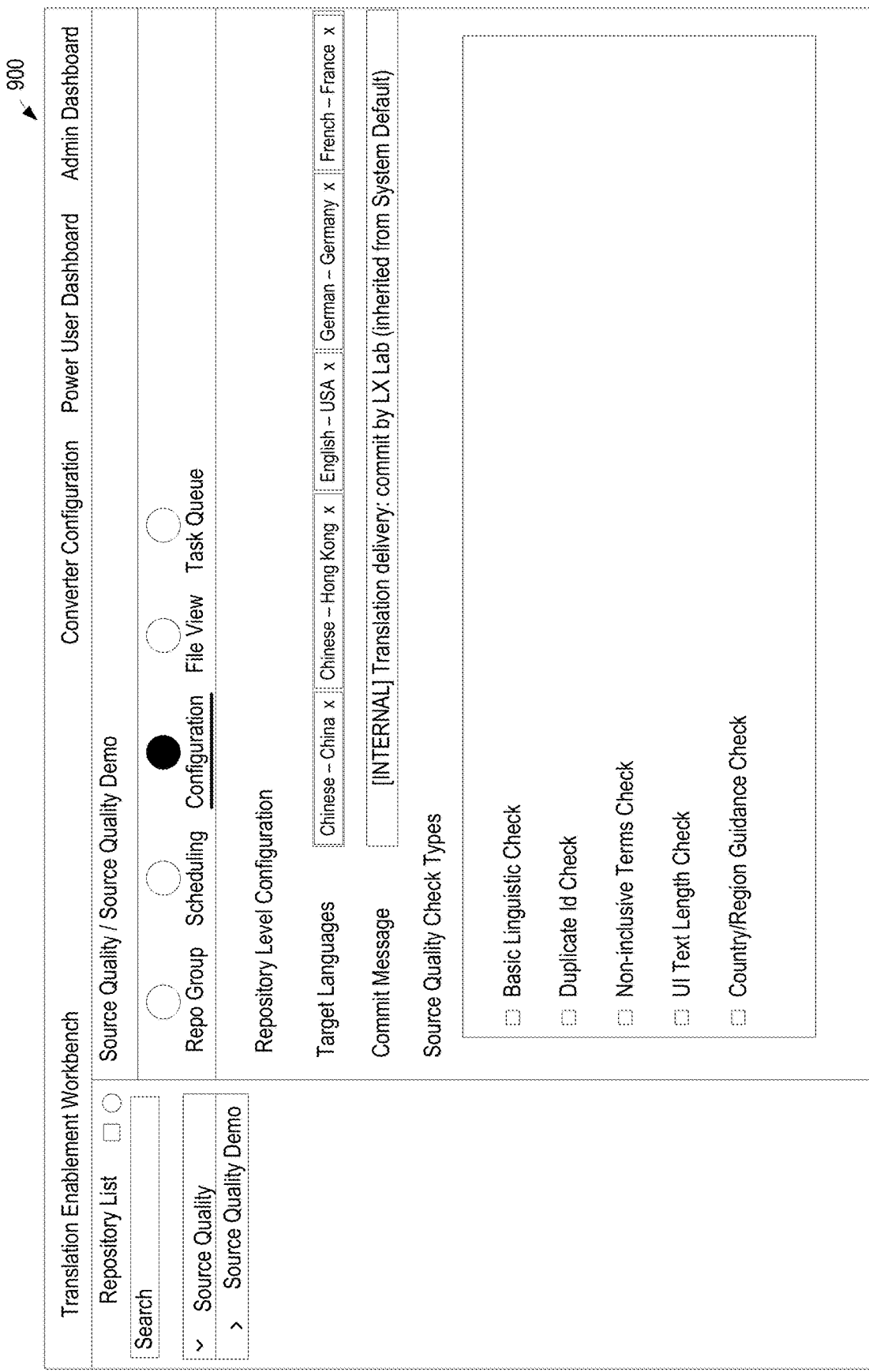

FIGS. 9-11 show example user interface windows for an SQCS integration scenario in a translation process. Before the upload of resource files to a translation system, the source quality check service can be triggered so that the developers can receive the quality report and fix the issues before the files are handed over to translation. The quality report can also be viewed by the translation project managers and translators. FIG. 9 shows a configuration window 900 of a user interface in which source quality checks to be performed are selected when in the translation environment. It is to be understood that the user interface window 900 of FIG. 9 is exemplary, and any of the checks described herein may be presented in a user interface accordingly. FIG. 10 shows a user interface window 1000 including a list of task groups and indications of issues found responsive to running the checks. For example, FIG. 11 shows a user interface window 1100 including an example detailed view of file segments and source quality issues identified by the source quality checks.

Example Method

Figure 12:
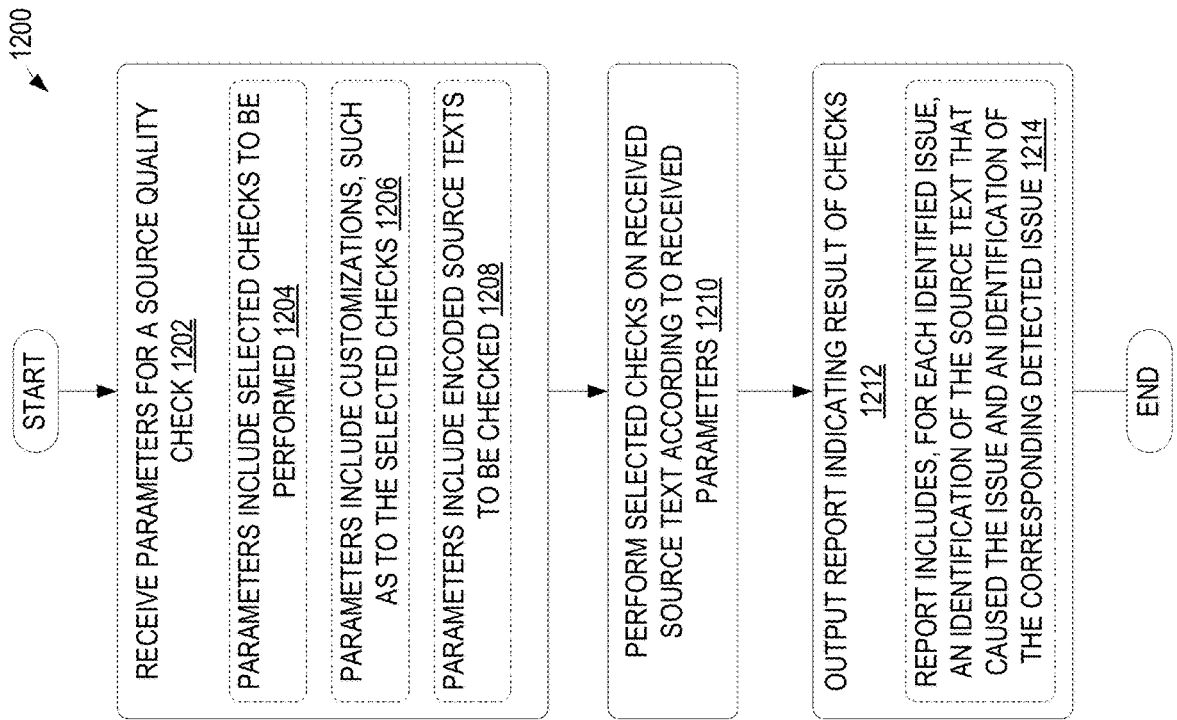
FIG. 12 is a flow chart of an example method of performing one or more checks using a service quality check service in accordance with the present disclosure.

FIG. 12 shows a flow chart of an example method 1200 of performing a source quality check using a source quality check service, such as the service provided by source quality check engine 104 of FIG. 1. The method 1200 may be performed by a computing device(s) implementing the source quality check engine, which may include a cloud-based service, such as hyperscale cloud provider 102 of FIG. 1.

At 1202, the method includes receiving parameters for a source quality check. As indicated at 1204, the parameters may include the selected checks to be performed (e.g., selected from available checks, such as those indicated in FIG. 1: text metadata checks, third party checks, local policy non-compliance checks, sensitive terminology checks, in-house checks, and/or other/future checks). As indicated at 1206, the parameters may further include customizations to the selected checks and/or other customizations. As a non-limiting example, if a sensitive terminology check is selected to be performed, the customization may include a blacklist (e.g., non-allowed) and/or whitelist (e.g., allowed) of terms for the check that may be modified by a user, administrator, or other authorized entity. For third party checks, customizations may include rules that are selectively enabled or disabled for a selected check. In some examples, the types of customizations that are available may depend on the checks selected to be performed, an authorization of the user performing the customization (e.g., an administrator or other entity representative may be allowed to perform more customizations and/or more globally-applied customizations relative to a lower-level user. The parameters received at 1202 may be included in a request to perform a source quality check. If the request does not include parameters, the source quality check engine may perform a check based on default and/or last-used parameters. The parameters included in the request may be derived from input to a user interface (e.g., integrated into and/or useable in coordination with a third party software program of an IDE, a build process, or a translation process) and/or a configuration file (e.g., as described above with respect to FIG. 8).

As indicated at 1208, the parameters may include source text (e.g., encoded source text) to be checked. The source text may be a portion of source text for programmable content and/or an entire software program. In some examples, the source text may be received as part of the request to perform the check described above with respect to operation 1202.

At 1210, the method includes performing the selected checks (or the default checks, if no selections of checks are received) on the received source text according to any parameters received at 1202 (e.g., the customizations received at 1206). If the source quality checks receive the check request either from the API calls or from the UI, it will first convert the file format in an interim exchangeable file format, which is industry standard XLIFF format. Then the source quality check service may run checks simultaneously against the interim format. If the selected checks include third party or in-house checks that are not native to the source quality check engine (e.g., not performed directly by the source quality check engine without use of third party check tools), the source quality check engine may send the received source text in the interim exchangeable file format and any relevant parameters to the respective third part or in-house check platforms and receive an associated result.

At 1212, the method includes outputting a report (e.g., in a machine-readable format and/or a human-readable format) indicating the result of the checks. If one or more third party and/or in-house checks were performed, the report may aggregate results from those checks with the native engine-based checks to generate the report. As indicated at 1214, the report may include, for each identified issue, an identification of a selection or portion of the source text that caused the issue and an identification of the corresponding detected issue. The report may in some examples include a suggestion for correcting and/or addressing the issue. Examples of reports are shown in FIGS. 2 and 6 and described in more detail above. In this way, the report may be usable to correct the identified issues in order to improve the overall quality of the source text before the source text is passed along to a next stage of development. In examples where the report is issued in a machine-readable format, the report may be used to automatically correct the issues and/or used by other tools in a targeted environment to assist a user in correcting the issues (e.g., by allowing the user to quickly locate and edit a line that includes an identified issue, as shown in FIG. 5).

After outputting the report, the API call corresponding to the source text check may be considered completed. If an additional source quality check is to be performed, another API call may be executed, which may include performing the method operations 1202-1214 for a subsequently-submitted source text and/or parameters. For example, a source quality check for a different framework and/or environment may be performed, as the method 1200 may be applicable to the source quality engine as integrated in the various environments described herein (e.g., IDE, build processes, and translation processes).

SQCS API

The following APIs are some non-limiting API examples for the disclosed SQCS:
1. An API that queries out of the file formats to be supported by SQCS
    i. .properties, .json., .javascript, Android .xml . . . etc.
2. An API to be applied for the available checks, such as the following examples:
    i. Text Metadata checks
    ii. Local Policy Non-Compliance Checks
    iii. Sensitive Terminology Checks
    iv. Third Party Integration Checks
    v. Existing In-house Checks and future checks
    vi. etc.
3. An API for executing requested checks in synchronous or asynchronous way.
    i. Input: a configuration file may include the following information:
        1. Project information
        2. Source file filters
        3. An identification of which checks are to be run and their configurations: text metadata (e.g., duplicate ID), local policy (e.g., country/region-specific guidance), etc.
        4. etc.
    ii. This API can be used for integration with IDE or Jenkins for build processes.

Technology Overview

The SQCS can be implemented on various hyperscale cloud platforms using different cloud technologies such as Cloud Foundry or Kubernetes. The following description relates to one example of tools and/or features relating to the implementation and/or development of SQCS in an environment such as a Kubernetes environment:

Programming may be performed in a suitable language, such as JavaScript
Using databases such as Postgres on Amazon Web Services (AWS)
The framework of NestJS for building Node.js server-side applications
Framework to help test API (e.g., Swagger)
Automatically document REST APIs in the source code.
SAP Cloud Foundry with backing services exposed to the Kubernetes environment
Jenkins pipeline for Continuous Integration/Continuous Delivery (CI/CD)

Example—Example Computing Systems

Figure 13:
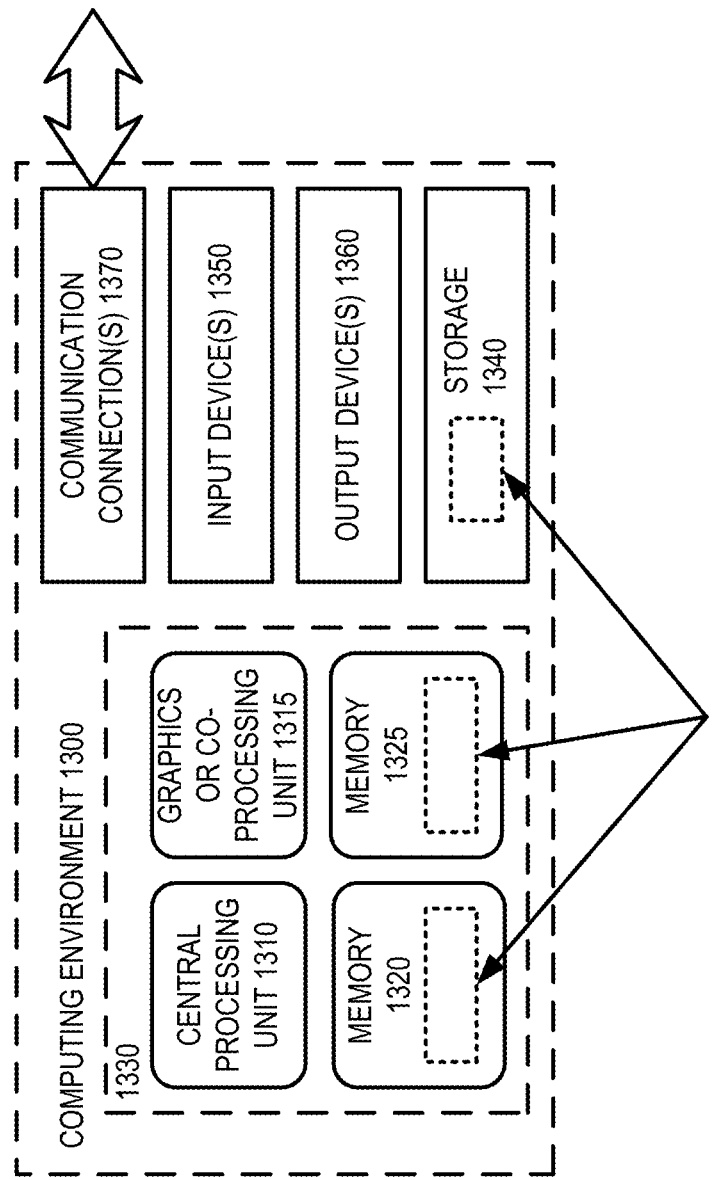
FIG. 13 is a diagram of an example computing system in which some described embodiments can be implemented.

FIG. 13 depicts an example of a suitable computing system 1300 in which the described innovations can be implemented. For example, the hyperscale cloud provider 102 and/or the source quality check engine 104 may be implemented by and/or within one or more computing systems such as computing system 1300. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

In any of the examples described herein, specialized memory hardware can be included to implement the DBA functionality.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300. For example, the input device 1350 and output devices 1360 may be used to interface with the source quality check engine user interface 110 and/or user interfaces of the implementation environments 112 of FIG. 1.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example—Example Cloud Computing Environment

Figure 14:
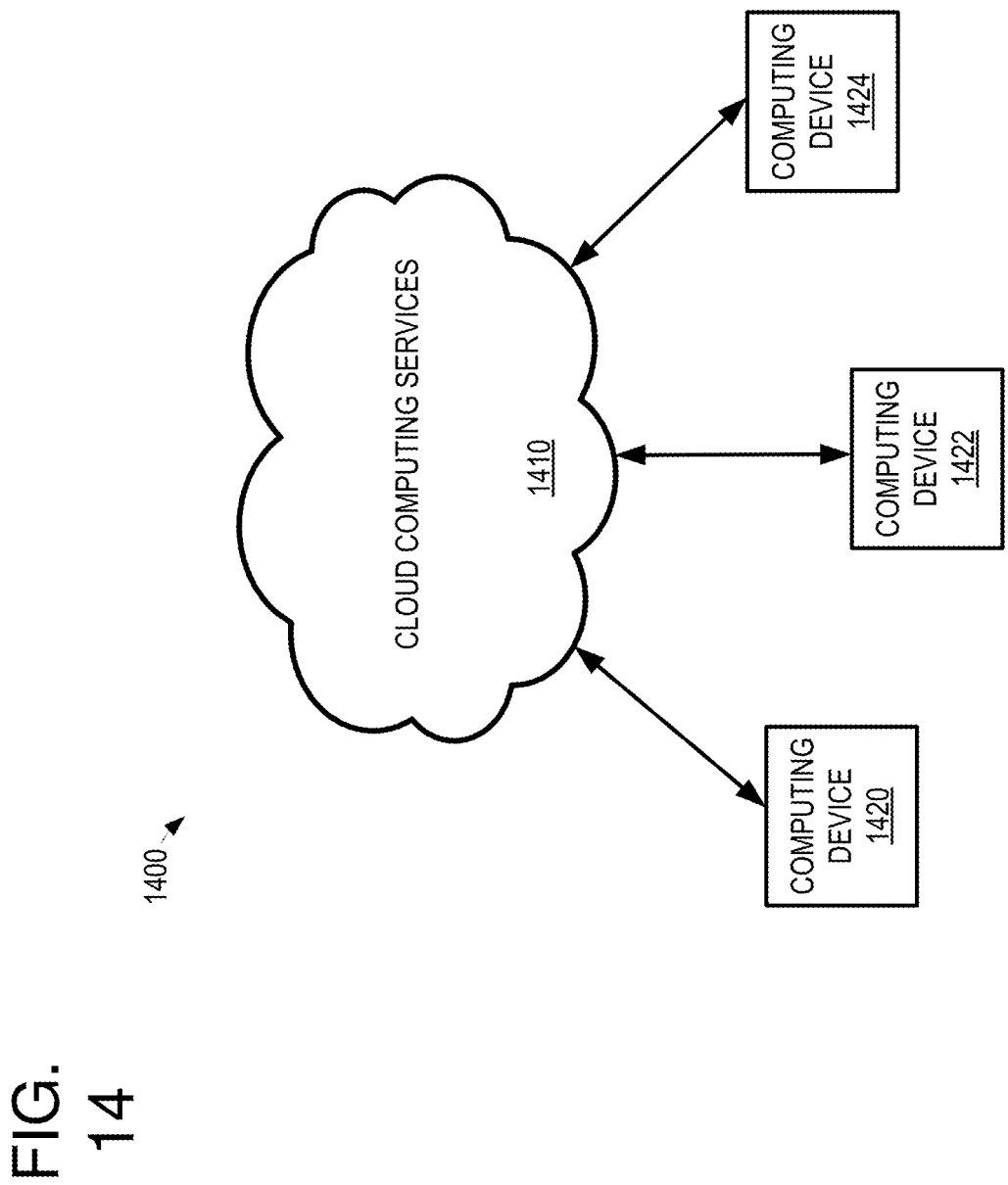
FIG. 14 is an example cloud computing environment that can be used in conjunction with the technologies described herein.

FIG. 14 depicts an example cloud computing environment 1400 in which the described technologies can be implemented. For example, the hyperscale cloud provider 102 and/or the source quality check engine 104 may be implemented by and/or within a cloud computing environment such as cloud computing environment 1400. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

FURTHER EXAMPLES

Any of the following Clauses can be implemented:

1) A system comprising: in a source quality check service system environment comprising one or more computing devices, a source quality check service configured to analyze source text and identify issues in the source text.
2) The system of Clause 1 wherein: the source text comprises source text of programmable content.
3) The system of any one of Clause 1-2 wherein: the source quality check service is configured to perform one or more checks to identify the issues in the source text, the one or more checks including a text parameter check, a local/regional policy compliance check, a duplicate string ID check, a length restriction check, a text type check, a corrupted character check, a pluralization check, a language detection check, a spelling check, a linguistic source issue check, a terminology check, a geopolitical check, and/or a pattern check.
4) The system of any one of Clauses 1-3 wherein: the source quality check service is configured to integrate with a third party tool to identify one or more issues in the source text.
5) The system of any one of Clauses 1-4 wherein: the source quality check service is configured to output a report indicating the identified issues in the source text.
6) The system of any one of Clauses 1-5 wherein: the source quality check service is called from within an Integrated Development Environment (IDE), a build process, and/or a translation process.
7) The system of any one of Clauses 1-6 wherein: the source quality check service system environment includes a cloud computing environment.
8) The system of any one of Clauses 1-7 wherein: the source quality check service is configured to perform one or more checks to identify the issues in the source text, the one or more checks including a local policy non-compliance check, a violation check, one or more checks included in in-house check tool, one or more checks using a third party service, a linguistic check, and/or a terminology check.
9) A method comprising: in a source quality check service system environment, receiving a request to perform one or more checks on source text of programmable content; and performing the one or more checks on the source text to identify one or more issues in the source text.
10) The method of Clause 9 wherein: the request is received via an Integrated Development Environment (IDE), a build process, and/or a translation process that is integrated with a source quality check service associated with the source quality check service system environment.
11) The method of any one of Clauses 9-10 further comprising: outputting a report indicating results of the performance of the one or more checks.
12) The method of any one of Clauses 9-11, wherein the one or more checks include a local policy non-compliance check, a violation check, one or more checks included in in-house check tool, one or more checks using a third party service, a linguistic check, and/or a terminology check.
13) The method of any one of Clauses 9-12, wherein the one or more checks include a text parameter check, a local/regional policy compliance check, a duplicate string ID check, a length restriction check, a text type check, a corrupted character check, a pluralization check, a language detection check, a spelling check, a linguistic source issue check, a terminology check, a geopolitical check, and/or a pattern check.
14) A system comprising: one or more processors; and one or more memories storing instructions executable by the one or more processors to perform instructions for providing a source quality check service, the instructions including: instructions for receiving a request to perform one or more checks on source text of programmable content, and instructions for performing the one or more checks on the source text to identify one or more issues in the source text.
15) The system of Clause 14 wherein the instructions further comprise: instructions for outputting a report indicating results of the performance of the one or more checks.
16) The system of any one of Clauses 14-15, wherein the one or more checks include a local policy non-compliance check, a violation check, one or more checks included in in-house check tool, one or more checks using a third party service, a linguistic check, and/or a terminology check.
17) The system of any one of Clauses 14-16, wherein the one or more checks include a text parameter check, a local/regional policy compliance check, a duplicate string ID check, a length restriction check, a text type check, a corrupted character check, a pluralization check, a language detection check, a spelling check, a linguistic source issue check, a terminology check, a geopolitical check, and/or a pattern check.

18) One or more non-transitory computer-readable storage media storing computer-executable instructions for causing a computing system to perform a method for generating clusters in a database model, the method comprising: receiving a request to perform one or more checks on source text of programmable content; and performing the one or more checks on the source text to identify one or more issues in the source text.

19) A method substantially as shown and described.

20) A system substantially as shown and described.

Advantages

In a typical translation scenario, translators may need to submit many questions to inquire about source text issues and other clarifications. If there are too many issues, translators may choose not to submit queries for all issues. If no questions are submitted, or if answers are not received in time, this may lead to possible wrong translations or translated texts that have been abbreviated unnecessarily. Issues in the source texts as well as lack of context during translation can result in mistranslations, negative user experience, and possible customer escalations. For example, costs for repairing a defect after release can be up to 640 times higher than if the issue is caught at the time of coding or building the software (and before the texts are provided to translation).

The disclosed service (SQCS) enables such problems to be detected early and before the customers see them, thereby saving a lot of time and costs. The disclosed service can be called up at different points along the content production process, such as from within an IDE, during a build process, and/or at the time of text arrival in the translation environment. By using the disclosed service, a translator may now focus on finding a best possible translation, instead of focusing on source text issues or other text corrections. Furthermore, developers may receive fewer queries and fix requests from the translation team. In this way, the disclosed service may increase overall efficiency and quality of the translation.

In any of the examples herein, operations can be performed on the source data in situ (in place, while the data resides in memory) by hardware associated with or integrated with the hardware storing the source data.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system comprising:
one or more processors; and
one or more storage devices storing instructions executable by the one or more processors to perform operations implementing a centralized source quality check (SQC) engine, the operations including:
computer-processing a request for performing a source quality check on software source code, wherein the request is issued via one or more calls by an application integrated with an Integrated Development Environment (IDE), a build process, or a translation process for development of a software application, wherein each of the IDE, the build process, and the translation process interface with the centralized SQC engine to issue calls requesting source quality checks to be performed on source code, and wherein the one or more calls are received via a respective interface of the centralized SQC engine,
analyzing the software source code for the software application in accordance with the request,
identifying issues in the software source code by performing a selected subset of checks with the centralized SQC engine, wherein the request to perform the source quality check includes customizations of rules for one or more of the selected subset of checks, wherein types of customizations that are available for the selected subset of checks are based on an authorization of a user performing the customization, wherein the selected subset of checks are selected from a plurality of checks that are available to be performed for each of the IDE, the build process, and the translation process based on the request, wherein the plurality of checks include a third-party check performed by a third-party tool integrated with or in communication with the centralized SQC engine and an additional check performed directly by the centralized SQC engine, wherein the issues are translation issues, and wherein the selected subset of checks identify potential problems that would occur during translation of content associated with the source code, and
outputting, to a user interface, graphical user interface elements indicating the identified issues in the source code and correcting the identified issues based on the indication of the identified issues.

2. The system of claim 1, wherein the one or more calls comprise one or more Application Programming Interface calls, and wherein the centralized SQC engine communicates with the application via a software plugin configured to issue the one or more Application Programming Interface calls.

3. The system of claim 1, wherein the operations further include converting the source code to an exchangeable file format before performing the selected subset of checks on the source code.

4. The system of claim 1, wherein the selected subset of checks on the source code include analysis of text parameters of the source code, local/regional policy compliance of the source code, sensitive terminology of the source code, duplicate string identifiers in the source code, length parameters for the source code, text types of the source code, corrupted characters in the source code, pluralizations in the source code, language detections for the source code, spellings of the source code, linguistic source issues in the source code, terminology of the source code, geopolitical parameters of the source code, and/or patterns of the source code.

5. The system of claim 1, wherein the instructions are further executable to generate data for the graphical user interface elements, based on results of performing the selected subset of checks, in a machine-readable format configured to be output or processed by the user interface, and wherein the data includes a suggestion for correcting or addressing one or more of the identified issues in the source code.

6. The system of claim 1, wherein the centralized SQC engine is hosted by a cloud provider of a cloud computing system that performs cloud-based computing operations.

7. The system of claim 1, wherein the selected subset of checks includes a local policy non-compliance check for the source code, a violation check for the source code, a linguistic check for the source code, and/or a terminology check for the source code.

8. A method comprising:
    in a source quality check service (SQCS) system, processing a request to perform one or more checks on source code of a software application in development, wherein the request is issued via a call by an application integrated with a development stage, the development stage including an Integrated Development Environment (IDE), a build process, or a translation process used during development of the software application, wherein each of the IDE, the build process, and the translation process interface with an engine of the SACS system to issue calls requesting source quality checks to be performed on source code, wherein the request is received via an interface of the SQCS system, and wherein the request to perform the source quality check includes customizations of rules for a selected subset of the one or more checks, and wherein types of customizations that are available for the selected subset of checks are based on an authorization of a user performing the customization;
    converting the source code to an exchangeable file format;
    analyzing the software source code for the software application in accordance with the request including performing the one or more checks on the source code to identify one or more issues in the source code, wherein at least two of the IDE, the build process, and the translation process are respectfully associated with a corresponding plurality of available checks, wherein the one or more checks are specified in the request and are selected from the corresponding plurality of available checks configured to be performed by the SQCS system in association with the development stage integrated with the application that issued the request via the call, wherein the one or more checks include a third-party check performed by a third-party tool integrated with or in communication with the SQCS system, and wherein performing the third-party check includes sending the source code in the exchangeable file format to a third-party check platform and receiving an associated result for the third-party check; and
    outputting, to a user interface centralized to two or more of the IDE, the build process, or the translation process, data for graphical user interface elements indicating the identified one or more issues in the source code and correcting the identified issues based on the indication of the identified issues, wherein the issues are translation issues associated with potential problems that would occur during translation of content of the source code.

9. The method of claim 8, wherein the third-party check is a first check, wherein the one or more checks further include a second check that is native to the SQCS system and performed directly by the SQCS system, wherein the data for the graphical user interface elements indicating the identified one or more issues in the source code include a report, and wherein the method further comprises generating the report by aggregating results from the first check and the second check.

10. The method of claim 8, wherein the SQCS system is hosted by a cloud provider of a cloud computing system that performs cloud-based computing operations, and wherein the interface at which the request to perform the one or more checks comprises the user interface centralized to the two or more of the IDE, the build process, or the translation process.

11. The method of claim 8, wherein the one or more checks include two or more of a local policy non-compliance check of the source code, a violation check of the source code, a linguistic check of the source code, or a terminology check of the source code.

12. The method of claim 8, wherein the data for the graphical user interface elements includes an identification of the one or more issues in the source code and respective suggestions to correct the one or more identified issues in the source code before the source code is passed along to a next stage of development of the software application.

13. A method comprising:
    computer-processing a request for performing a source quality check on software source code using a centralized source quality check service, wherein the request is received via one or more application programming interface calls issued by a respective computer application for an Integrated Development Environment (IDE), a build process, or a translation process for development of a software application, wherein each of the IDE, the build process, and the translation process interface with an engine of the centralized source quality check service to issue calls requesting source quality checks to be performed on source code, wherein the one or more calls are received via a respective interface of the engine, and wherein the IDE, the build process, and the translation process are respectively associated with a corresponding plurality of checks configured via the centralized source quality check service;
    analyzing the software source code for the software application in accordance with the request;
    identifying issues in the software source code by performing a selected subset of checks, wherein the request to perform the source quality check includes customizations of rules for one or more of the selected subset of checks, wherein types of customizations that are available for the selected subset of checks are based on an authorization of a user performing the customization, wherein the selected subset of checks are selected from the corresponding plurality of checks that are available to be performed for the IDE, the build process, or the translation process, wherein the issues are translation issues, wherein the selected subset of checks identify potential problems that would occur during translation of content associated with the source code, and wherein the corresponding plurality of checks include a third-party check configured to be performed by a third-party tool integrated with or in communication with the centralized source quality check service; and
    outputting, to a user interface, data for graphical user interface elements indicating the identified issues in the source code and correcting the identified issues based on the indication of the identified issues.

14. The method of claim 13, wherein the plurality of checks of the source code includes a local policy non-compliance check of the source code, a violation check of the source code, a linguistic check of the source code, and/or a terminology check of the source code.

15. The method of claim 13, wherein the selected subset of checks are selected via input to the user interface and received via the one or more Application Programming Interface calls.

16. The method of claim 13, wherein the one or more Application Programming Interface calls include a first Application Programming Interface call made by a first respective computer application used for the IDE or the build process of the development of the software application, and wherein the method further comprises computer-processing a second Application Programming Interface call made by a second respective computer application used for the translation process of the development of the software application.

17. The method of claim 13, further comprising converting the source code to an exchangeable file format before performing the selected subset of checks on the source code, wherein the selected subset of checks includes the third-party check, and wherein performing the selected subset of checks comprises sending the converted source code in the exchangeable file format and one or more parameters to a respective third-party check platform configured to perform the third-party check and receiving an associated result of the third-party check from the third-party check platform.

18. The method of claim 13, wherein at least two of the checks in the selected subset of checks are performed on the source code simultaneously.

19. The method of claim 13, wherein the data for the graphical user interface elements includes an identification of the one or more issues in the source code and respective suggestions to correct the one or more identified issues in the source code before the source code is passed along to a next stage of development of the software application.

\* \* \* \* \*